April 10, 1962   E. KENNEDY ET AL   3,028,713
ARTICLE COUNTING AND LOADING MACHINE
Filed Oct. 2, 1958   6 Sheets-Sheet 2
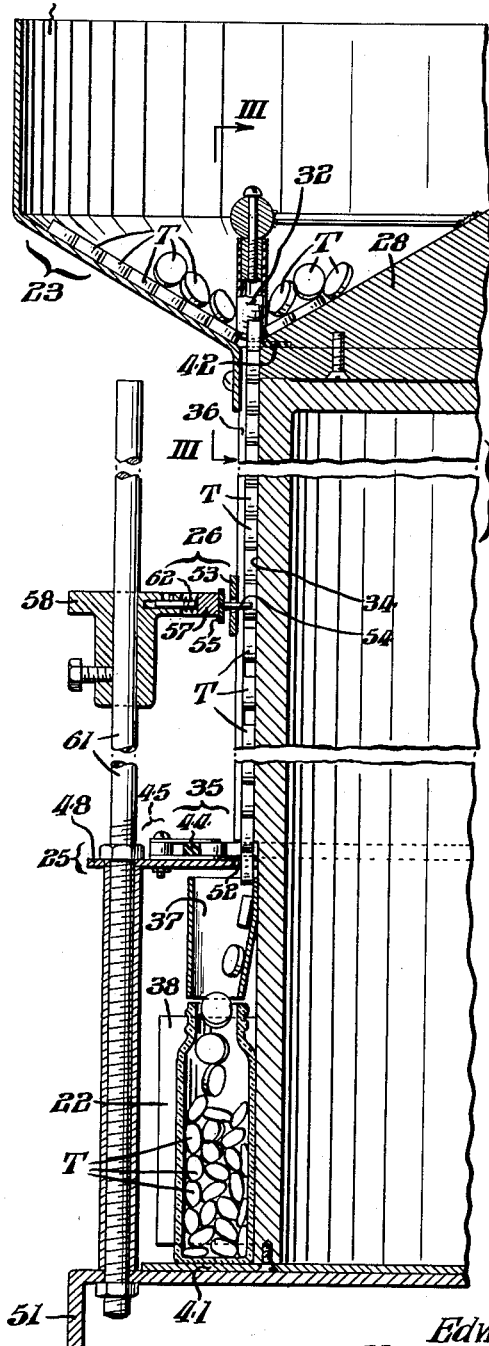
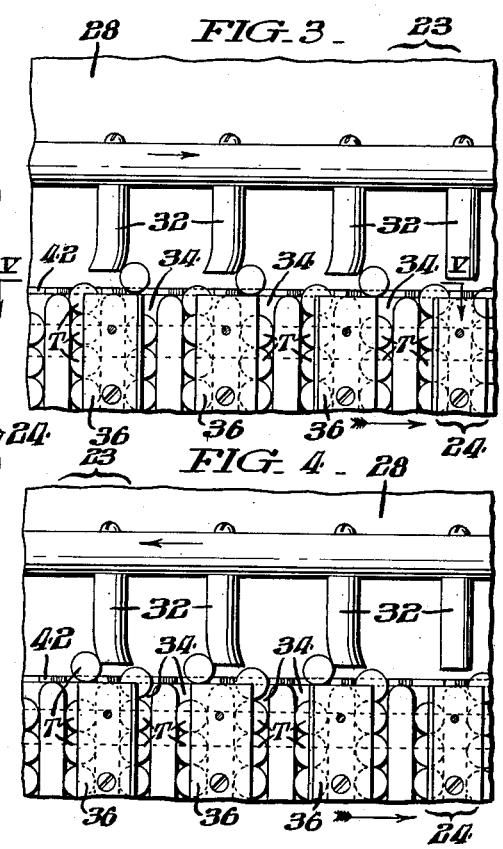
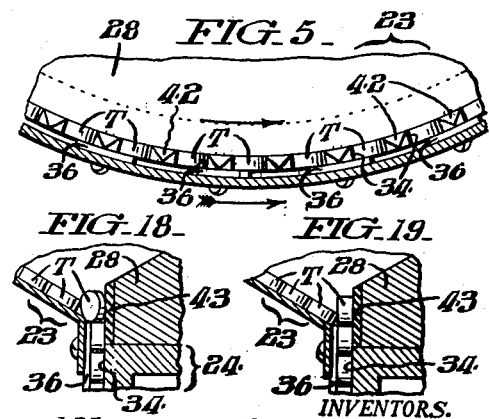
INVENTORS.
Edward Kennedy, Henry Martinez,
Herman Paprzycki & Dominick Stabilito,
BY Paul & Paul
ATTORNEYS.

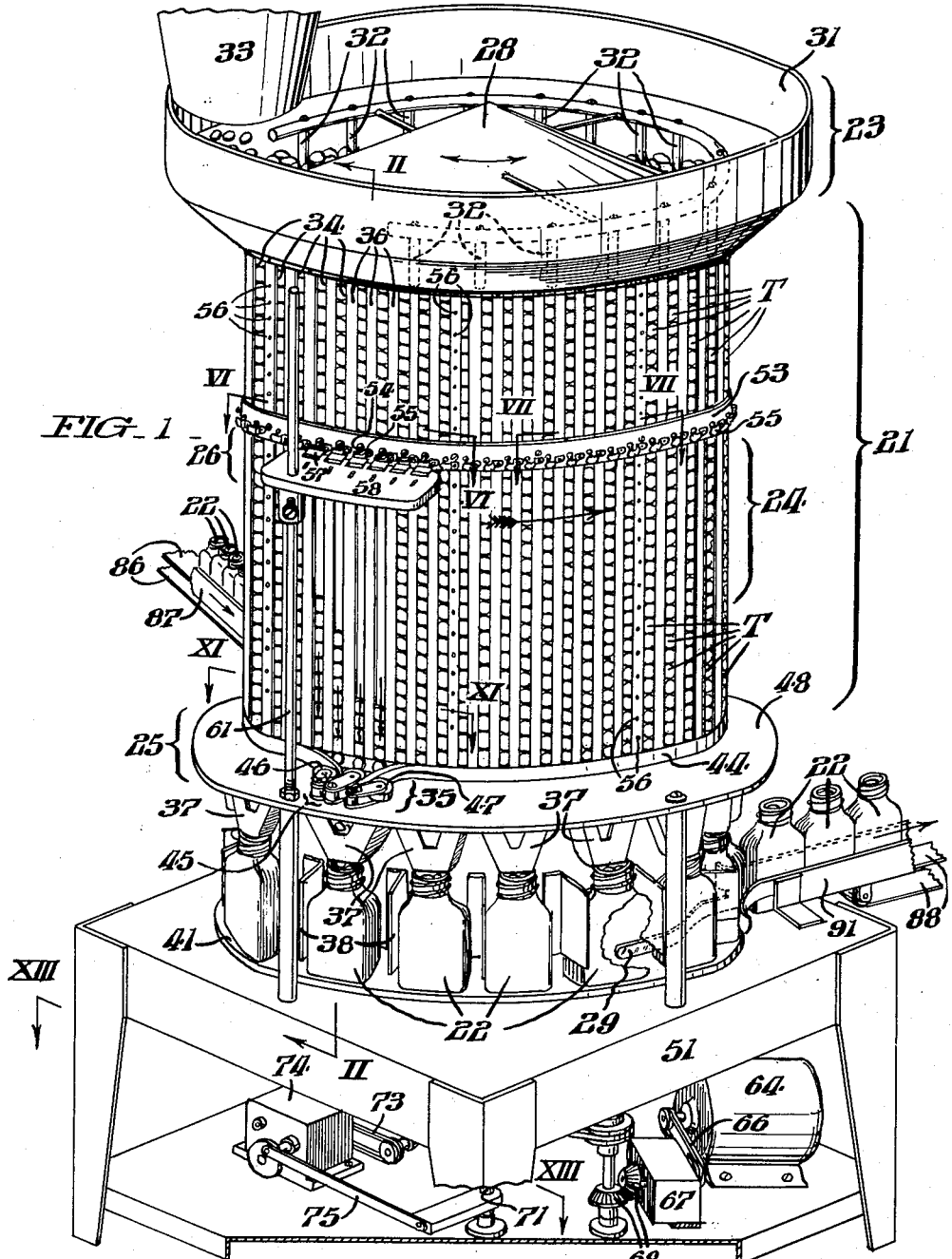

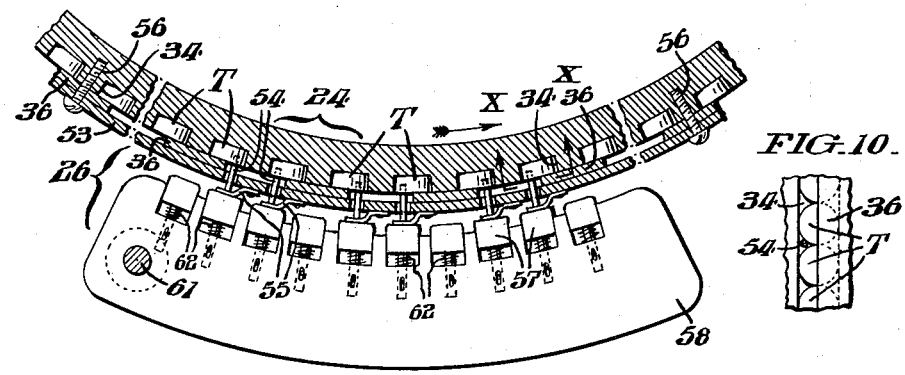
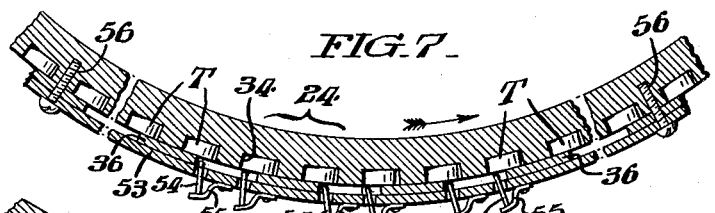
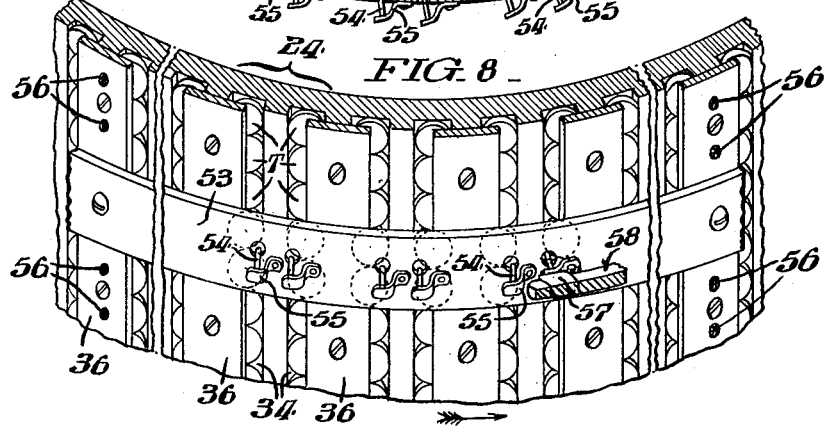
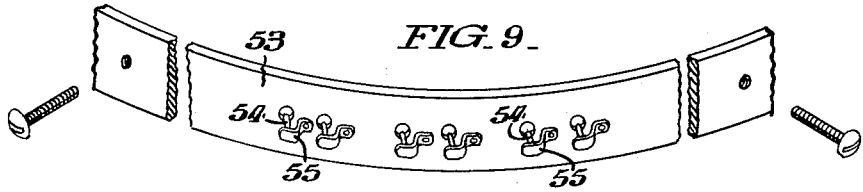

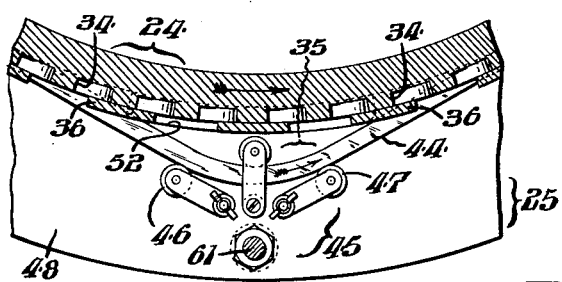
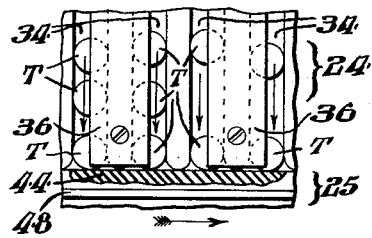
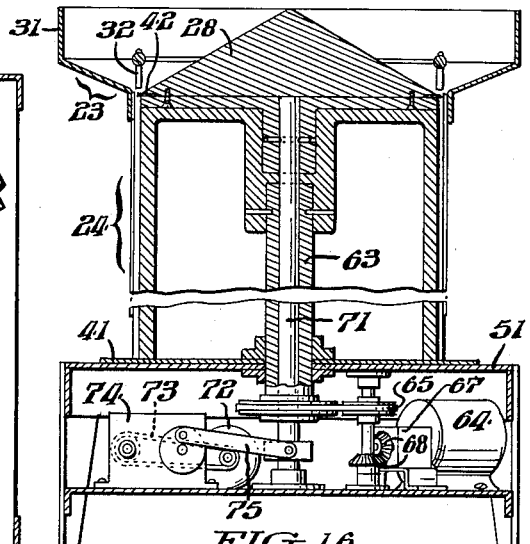
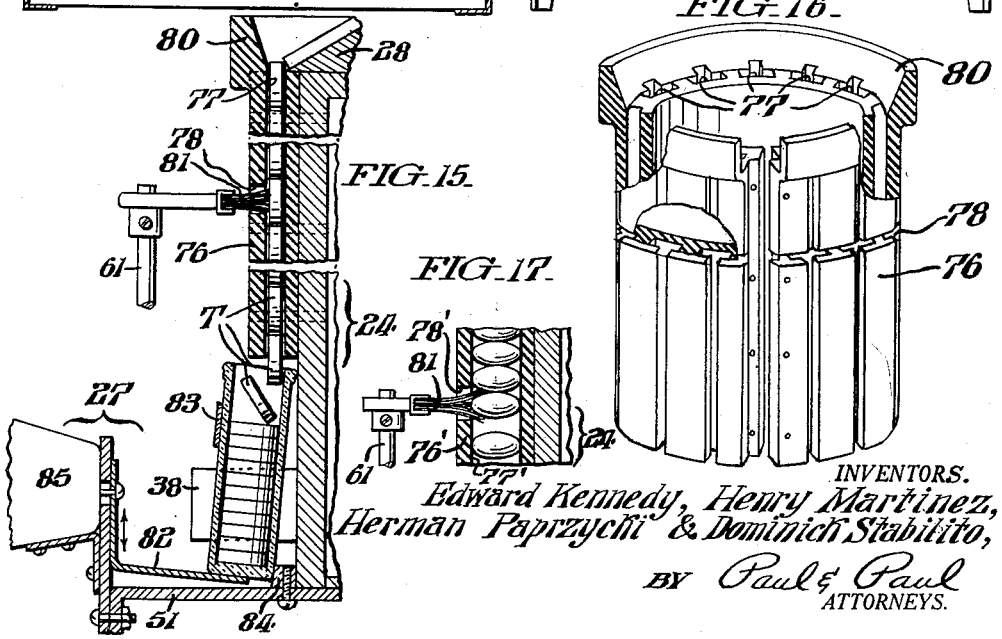
INVENTORS.
Edward Kennedy, Henry Martinez,
Herman Paprzycki & Dominich Stabilito,
BY Paul & Paul
ATTORNEYS.

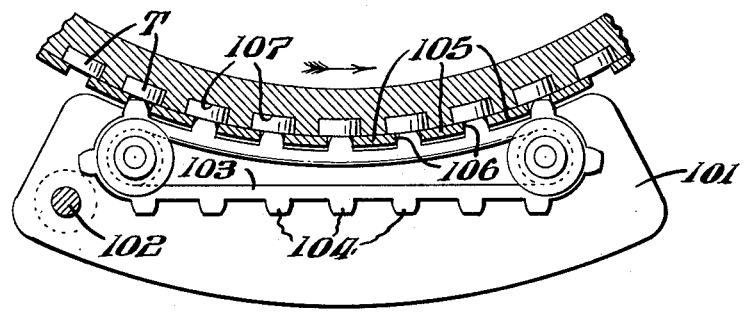
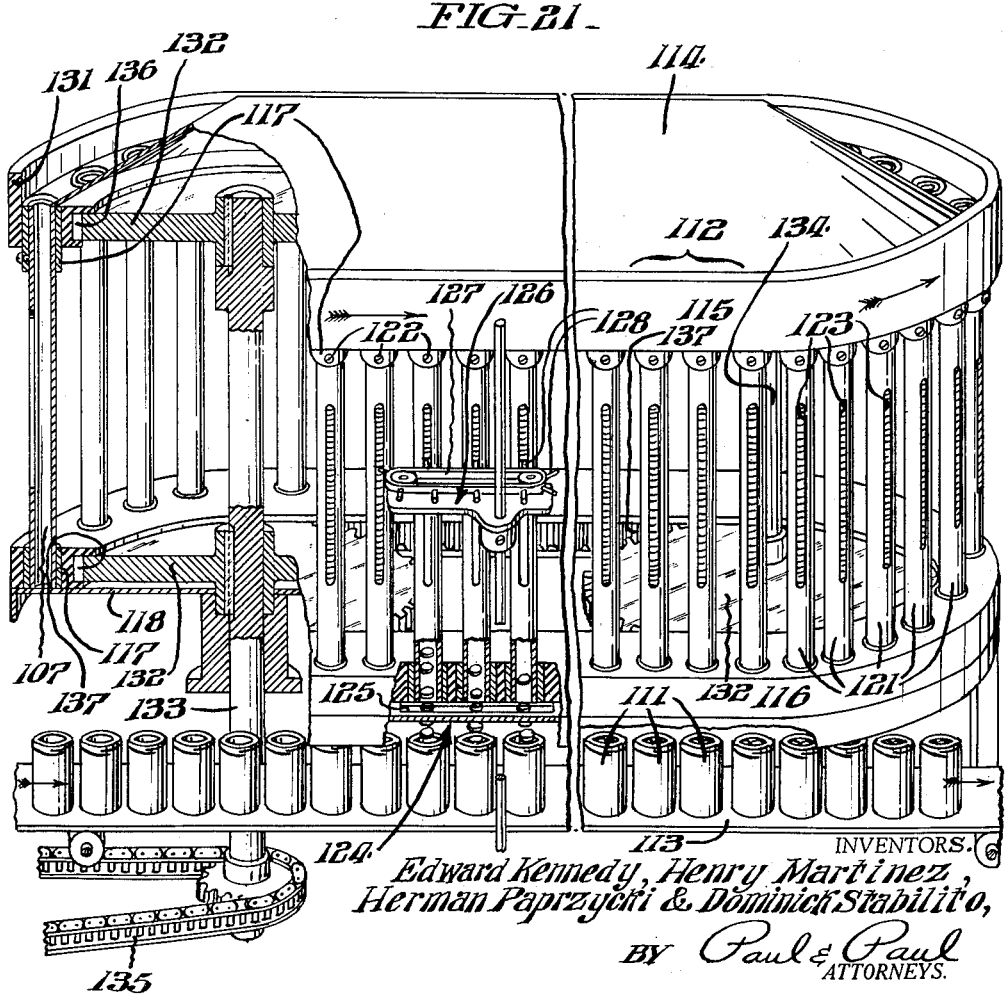

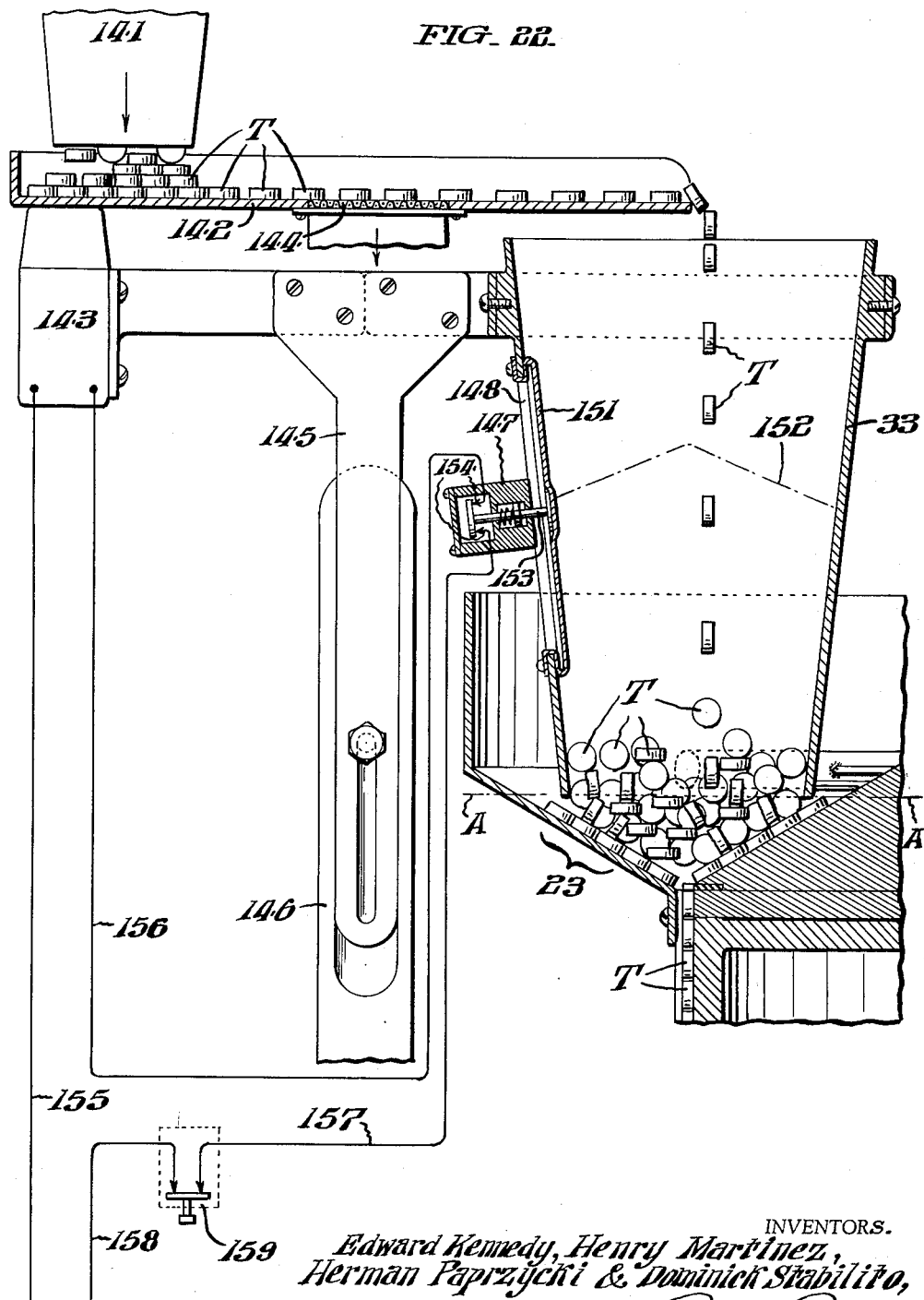

ated by the lines and arrows VII—VII which appear in FIG. 1;

FIG. 8 is a view in perspective of the apparatus of FIG. 7;

FIG. 9 is a view in perspective of the article arresting band forming a part of the invention;

FIG. 10 represents a view taken as indicated by the lines and arrows X—X which appear in FIG. 6;

FIG. 11 represents a view in section taken as indicated by the lines and arrows XI—XI which appear in FIG. 1;

FIG. 12 is a fragmentary view partly in section and partly in elevation, and illustrates the action of the tablets approaching the bottom of the passages shown in FIG. 1;

FIG. 13 is a view in horizontal section taken as indicated by the lines and arrows XIII—XIII of FIG. 1 and illustrates the drive mechanism of the invention;

FIG. 14 is a view in vertical section illustrating the drive mechanism of the invention;

FIG. 15 is a view in section similar to the view in FIG. 2 and illustrates a modification of the invention;

FIG. 16 is a view partly in perspective and partly in section of a belt forming part of the modified rotatable distributor member illustrated in FIG. 15;

FIG. 17 is a view similar to FIG. 15 and shows a modification of the invention;

FIG. 18 is a partial view in section of another modification of the invention and shows a tablet in canted position as it is being fed to the machine;

FIG. 19 is a view similar to FIG. 18 showing the canted tablet at a later stage in operation;

FIG. 20 is a view similar to the view in FIG. 6 and illustrates another embodiment of the invention;

FIG. 21 is a view in perspective and partly in section of another embodiment of a tablet counting and loading machine constructed in accordance with this invention, with the tablets removed from the feed mechanism in order to show more clearly important details; and FIG. 22 is a view in elevation and partly in section of the feed mechanism constructed in accordance with this invention.

Although specific terms are used for clarity in the following description, these terms are intended to refer only to the structure shown in the drawings and are not intended to define or limit the scope of the invention. The word "container" is herein used to mean any type container of proper size, and includes bottles, boxes or cans. Further, such containers may be constructed of any material such as glass, plastic, or metal, for example. The word "tablet" as it appears in the specification and claims is intended to include various types and sizes of small articles all having essentially the same size and shape, such as pellets, pills, capsules, candy, nuts, washers, and any other equivalent articles all of the same approximate size and shape.

Turning now to the specific embodiments of the invention selected for illustration in the drawings, the counting and loading machine is designated generally by the number 21 and is operated to count and load tablets T into bottles 22. Machine 21 broadly includes a feed mechanism 23, a rotatable distributor member 24, a stop mechanism 25 located at the lower end of distributor member 24 for holding tablets T in distributor member 24, and arresting means 26 for retaining within distributor member 24 all but a predetermined number of tablets T, the predetermined number of tablets T being delivered to bottles 22.

Also provided is a vibrating mechanism 27 (FIG. 15) for shaking down the tablets T in the bottles after the filled bottles have been deflected from distributor member 24 by deflecting finger 29.

United States Patent Office 3,028,713
Patented Apr. 10, 1962

3,028,713
ARTICLE COUNTING AND LOADING MACHINE
Edward Kennedy, 436 E. Van Kirk St., and Henry Martinez, 6052 Loretto Ave., both of Philadelphia, Pa.; Herman Paprzycki, 629 Highland Ave., Merchantville, N.J.; and Dominick Stabilito, 5643 Heiskell St., Philadelphia, Pa.
Filed Oct. 2, 1958, Ser. No. 764,912
19 Claims. (Cl. 53—251)

This invention relates to improvements in a counting and loading machine for a plurality of discrete articles all of which are essentially of the same size and shape, and more particularly concerns a machine for automatically filling containers with a given number of tablets or the like.

It is an object of this invention to provide a counting and loading machine having a feed mechanism which insures a continuous supply of articles to be counted and loaded into containers, even though the machine fills containers at an extremely high rate of production. It is another object to provide such a machine which handles the articles gently during its operation to avoid chipping and breaking.

It is another object of this invention to count and load a large number of tablets in a bottle, and to do so using a machine of considerably smaller height than with the machines heretofore used.

It is another object of the invention to provide a machine for counting and loading a large number of tablets, which machine provides for counting out a wide range of tablets, from a low number to quite a large number of tablets.

It is another object of this invention to provide such a machine which loads tablets into bottles which are filled while the bottles are being carried along in a continuous uniform motion, rather than being filled during an intermittent motion as in some of the prior art.

It is another object of this invention to provide such a machine which is easily adapted to handle tablets having a very high crown, round tablets, capsules, and in general, articles of any shape. It is another object to provide such a machine having article arresting mechanism which is readily adjustable to deliver various quantities of articles to the containers. It is another object to provide such a machine wherein the articles are uniformly spaced within the container and do not stand on edge or otherwise unnecessarily take up room.

Other objects and advantages of the invention, including its simplicity and economy, as well as the ease with which it may be adapted to existing equipment, will further become apparent hereinafter and in the drawings, in which:

FIG. 1 is a view in perspective of a tablet counting and loading machine constructed in accordance with this invention, with most of the tablets removed from the feed mechanism in order to show more clearly important details;

FIG. 2 is a view in section taken as indicated by the lines and arrows II—II which appear in FIG. 1;

FIG. 3 is an enlarged fragmentary view of part of the feed mechanism of the invention and is taken as indicated by the lines and arrows III—III which appear in FIG. 2;

FIG. 4 is a view similar to FIG. 3 but showing the upper member rotating in the opposite direction;

FIG. 5 is a fragmentary view in top plan taken as indicated by the lines and arrows V—V which appear in FIG. 3;

FIG. 6 is a view partly in section taken as indicated by the lines and arrows VI—VI which appear in FIG. 1;

FIG. 7 is a fragmentary view in section taken as indi-

Feed mechanism 23 includes a dome member 28 which may be oscillated when desired to assure an even flow of tablets T to distributor member 24, a distributor ring 31 which is mounted on distributor member 24 and which extends outwardly and upwardly therefrom to form a feed trough with dome member 28. Dome member 28 need not be oscillated except when filling distributor member 24.

At the bottom of distributor ring 31 and dome member 28, the tablets T enter distributor member 24 and are aided in their entrance by resilient distributor fingers 32 which are mounted on dome member 28 and which agitate the tablets T to keep them flowing. Distributor fingers 32 are preferably made of rubber and oscillated with dome member 28. The action of distributor fingers 32 in agitating tablets T is shown in FIGS. 3 and 4.

Tablets T are delivered to feed mechanism 23 through a chute 33 which is positioned above the feed mechanism.

Tablets T are delivered from feed mechanism 23 to passages 34 which are elongated and downwardly disposed in distributor member 24. The exit end of the passages 34 are blocked to prevent the tablets T from falling out. Passages 34 are unblocked at delivery station 35 and are at that location directed into the bottles 22.

Passages 34 are provided with a cover plate 36 attached to the surface of distributor member 24 and extending over at least a portion of the longitudinal opening in the passages. Positioned below the passages 24 are funnels 37, vertically disposed flanges 38, and a horizontal flange 41 on which the bottles 22 rest and are swung along in the path of the rotating passages 34 as they are being filled with tablets T.

Provision is made to avoid chipping and breaking tablets T. On dome member 28 a resilient buffer member 42 (FIGS. 2–5) is provided for this purpose. In the embodiment of the invention illustrated in FIGS. 18 and 19, a vertically disposed buffer member 43 is provided for the same purpose. Buffer member 43 performs the additional function of flattening a canted tablet T as is shown in FIGS. 18 and 19. Buffer member 43 accomplishes this flattening by means of its oscillating action.

At the bottom of passages 34 there is provided a buffer belt 44, preferably made of rubber, which breaks the fall of the tablets T in the passages 34. Buffer belt 44 is drawn away from the exit end of passages 34 at delivery station 35 by the roller mechanism 45, and includes the adjustable rollers 46, 47 which provide for varying the tension in belt 44. FIG. 12 illustrates the action of buffer belt 44 breaking the fall of tablets T as they reach the exit end of passages 34, and FIG. 11 illustrates the operation of roller mechanism 44 pulling buffer belt 44 away from the exit end of passages 34 to unblock the passages.

Stop mechanism 25 includes a platform 48 which is fixedly mounted on a table 51 and which has a delivery opening 52 located therein at delivery station 35.

Arresting mechanism 26 includes a band 53 having mounted thereon pins 54 which are yieldingly urged outwardly by springs 55. Band 53 is adjustable to various positions along passages 34 since it is mounted on distributor member 24 by being screwed into the screw holes 56 which are spaced along the longitudinal length of distributor member 24.

When the bottles 22 are being loaded, pins 54 are pressed into passages 34 to arrest the downward movement of the tablets T located above the pins 54 and thus deliver a predetermined, counted number of tablets to the bottles 22. The pins 54 are pressed into passages 34 by plungers 57 which are yieldingly mounted on a plate 58. Plate 58 is adjustably mounted on a vertical rod 61, and plungers 57 are urged outwardly by springs 62. Springs 62 are provided so that if pins 54 should be prevented from entering fully into passages 34 by, for example, the pin 54 striking against a tablet T, the pin 54 yields so as not to break the tablet T. In such a situation, the pin arrests the fall of the tablet T against which it is pushing and also arrests the fall of all the tablets T located above the contacted tablet. Normally, pins 54 enter a passage 34 at a point spaced from the center line of the passage and inserts itself between two tablets T as is illustrated in FIG. 10. FIG. 8 shows the operation of plate 58 and plungers 57 in pushing pins 54 into the passages 34 as distributor member 24 is rotated.

The drive mechanism of machine 21 is illustrated in FIGS. 13 and 14. Distributor member 24 has a cylindrical drive shaft 63 which is rotated by a motor 64 through suitable belts 65, 66, gear reduction box 67, and gears 68. Dome member 28 is oscillated when desired by a shaft 71 which is positioned concentrically with cylindrical shaft 63. Shaft 71 is driven by motor 72 through appropriate devices such as belt 73, gear reduction box 74, and crank arm 75.

As is shown in FIG. 16, distributor member 24 may include an outer belt 76 having T-shaped slots 77, with a transversely disposed opening 78 formed therein to provide for the admission of article arresting means to slots 77. Such article arresting means may include a knife which is inserted into the tube to arrest the fall of the upper tablets T, or it may include a brush 81 as illustrated in FIGS. 15 and 17. Belt 76 is provided with an upwardly and outwardly directed flange 80 which forms a distributor ring to accommodate a large number of tablets in the feed mechanism.

In FIG. 17, there is provided elongated tubes 77' which are cylindrical in shape and transverse opening 78' which form an outer belt 76'. Belt 76' accommodates tablets with a high crown, whereas belt 78 accommodates tablets such as are illustrated and positioned in FIG. 15.

Vibrating mechanism 27, as shown in FIG. 15, includes a substantially horizontally disposed vibrating plate 82 and a guide strap 83 which prevents bottle 22 from tipping over when the bottom of bottle 22 is kicked outwardly onto plate 82 by bottom guide strap 84. A vibrator 85 imparts the vibrating motion to plate 82.

The empty bottles 22 are delivered to distributor member 24 by conveyor 86 having a guide strap 87, and the filled bottles are delivered from distributor member 24 by a conveyor 88 having a guide strap 91.

In operation, the tablets T are delivered in great quantity to the feed mechanism 23 through chute 33. Feed mechanism 23 because of its shape can accommodate a very large quantity of tablets T and move them into the entrance end of passages 34 through the operation of oscillating dome member 28 and resilient fingers 32. The tablets T fill passages 34 and at delivery station 35 a counted number of tablets T is delivered to the bottles 22. The desired number of tablets T is counted and the remaining tablets T in the passages 34 are arrested in the passages through the operation of arresting mechanism 26. The bottles 22 approach distributor member 24 on conveyor 86 and are transported along the path of the rotating passages 24 while being filled, and are then delivered to conveyor 88 having been shaken down by vibrator mechanism 27 if desired.

It is to be noted that the machine constructed in accordance with this invention counts and loads a large number of tablets in a bottle, and yet requires a considerably smaller height than required by previous machines. This is accomplished by having four passages 34 of tablets T feed into one bottle 22 simultaneously, as indicated in FIG. 1 by the four downwardly directed arrows in the passages 34 that are feeding tablets T to the bottle 22 in the filling position shown. Also, the apparatus of the present invention makes provision for counting out a wide range of tablets, from a low of four tablets per bottle when plate 58 is in its bottom position, to a large number of tablets (amounting to four times the number of tablets in one vertical passage way 34) when the plate 58 is in its highest position. These features are highly advantageous.

It is to be noted that another feature of this machine is that the bottles are filled during a continuous uniform motion rather than during an intermittent motion, as in some heretofore proposed machines.

The modification of the invention shown in FIG. 20 shows a plate 101 which is adjustably mounted on a vertical rod 102 and which supports an endless belt 103 having projections 104 thereon. Cover plates 105 are so positioned that they form a central slot 106 in front of vertical passage ways 107. Belt projections 104 register with slots 106 to arrest the tablets within passage ways 107.

FIG. 21 shows a modification of the invention wherein the shape of the machine is oval instead of cylindrical. This oval shape provides for a continuous straight line feed of the bottles 111 which are transported to and away from distributor 112 by conveyor 113.

In this embodiment of the invention there is provided a stationary dome 114 which is positioned above distributor 112, and distributor 112 includes an upper rubber belt 115 and a lower rubber belt 116 which are provided with cylindrical inserts 117. Beneath lower insert 116 is a fixed base plate 118, and positioned between upper rubber belt 115 and lower rubber belt 116 are removable tubes 121. Tubes 121 are held in place by screws 122, and are provided with a window slot 123. Tubes 121 are easily replaceable which adds a good deal of flexibility to the machine since when it is desired to load a tablet of different size than the tablet presently being loaded, the presently used tubes 121 are removed and replaced by tubes of an inside diameter which conforms to the size of the new tablets.

The tablets are prevented from dropping out of the passages 107 by the fixed base plate 118 except at the loading station 124 which is provided with a slot 125 through which the tablets pass into the bottles 111. The tablets are arrested at the loading station 124 by the arresting mechanism 126 which includes an endless belt 127 having projections 128 which extend into tubes 121 through window slots 123.

Upper belt 115 is provided with an upper flange 131 which forms a distributor ring to accommodate a large number of tablets in the feed mechanism.

Distributor 112 is driven by sprockets 132 which are mounted on drive shaft 133 and idler shaft 134. Drive shaft 133 is driven by a sprocket drive chain 135. The teeth of the sprockets 132 mesh with the teeth 136 of upper belt 115 and the teeth 137 of lower belt 116. Tubes 121 are preferably made of a transparent material, such as plastic.

FIG. 22 illustrates the mechanism for controlling the height of tablets T in chute 33 of the feed mechanism. The tablets T are fed from a hopper 141 onto a conveyor plate 142 which is vibrated by vibrator 143 to transport the tablets T to the end of the plate 142 where they drop into chute 33.

As the tablets T pass from hopper 141 to chute 33 over conveyor plate 142, they pass over a screen 144 which screens out all dust and fines. Both vibrator 143 and chute 33 are mounted on an adjustable bracket 145 which may be positioned at various heights on support 146. The position of chute 33 determines the level A—A of the tablets T in feed mechanism 23.

In order to regulate the height of the tablets T within chute 33 there is provided an electrical circuit which includes an electric switch 147 which is adjustably mounted in a slot 148 of chute 33. A protective cover 151 of thin plastic or the like is provided for slot 148. Switch 147, which is the vibrator cut-off switch, is positioned at the appropriate height so that the top of the tablets contained within chute 33 falls approximately along the line 152. When this height of tablets is reached, the weight of the tablets actuates the plunger 153 to disconnect the electrical contacts 154 and thus break the circuit to the vibrator so that no more tablets fall off conveyor plate 142 into chute 33. When the height of the tablets falls below the desired height, the tablets no longer exert a force on plunger 153, and the electrical circuit of vibrator 143 is automatically re-established. It is advantageous to thus control the height of the tablets in chute 33 so that optimum results are obtained in feeding tablets to feed mechanism 23 without clogging, and without breaking the tablets. The electrical circuit of vibrator 143 also includes the electrical conductors 155 through 158 which are connected to a source of electrical power (not shown) and on-off switch 159.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

Having thus described our invention, we claim:

1. A counting and loading machine for a plurality of discrete articles all of which are essentially of the same size and shape comprising a rotatable distributor member having a plurality of elongated passages formed therein; feed means including a dome member positioned on top of said distributor member, means for oscillating said dome member, a distributor ring attached to the top portion of said distributor member and extending outwardly therefrom to form a feed trough with said dome member for positioning said discrete articles at the feed entrance to said passages which is located at the bottom of said trough, and resilient distributor fingers mounted on said dome member and positioned above said bottom of said trough and said passage feed entrance to agitate said discrete articles to keep them flowing; stop means adjacent said passages; arresting means arranged adjacent said passages at a location spaced upwardly of said stop means for arresting the articles above said location and preventing their downward movement when said passages are unblocked; whereby a predetermined counted number of said articles is delivered by gravity to a container; means swinging said container along in the path of said rotating passages as the container is being filled with said articles; and vibrating means for shaking down the articles in said container.

2. In a counting and loading machine for a plurality of discrete articles all of which are essentially of the same size and shape, the combination comprising a distributor member which is rotatable about a substantially vertical axis, said member having a plurality of elongated passages formed therein, each such passage having a feed entrance adjacent its top, feed mechanism comprising a dome member positioned on said distributor member, means for oscillating said dome member, means forming a feed trough surrounding said dome member, the bottom of said trough being located at said feed entrances of said passages, said trough extending outwardly from said axis beyond said distributor member.

3. In a counting and loading machine for a plurality of discrete articles all of which are essentially of the same size and shape, the combination comprising a distributor member which is rotatable about a substantially vertical axis, said member having a plurality of elongated passages formed therein, each such passage having a feed entrance adjacent its top, feed mechanism comprising a dome member positioned on said distributor member, means forming a feed trough around said dome member, a plurality of resilient members suspended into said trough, and means for supporting said resilient members from a location above the bottom of said trough.

4. The combination defined in claim 3, wherein a resilient buffer member is positioned beneath said resilient distributor members to cushion the impact of said discrete articles.

5. The combination defined in claim 3, wherein a resilient buffer member is mounted on the outer perimeter of said dome member to cushion the impact of said discrete articles and to position said discrete particles for entrance into said passages.

6. In a counting and loading machine for a plurality of discrete articles all of which are essentially of the same size and shape, the combination comprising a rotatable distributor member having a plurality of elongated passages formed therein, said passages being downwardly directed so that gravity exerts a force on discrete particles located within said passages to move them therethrough, a stationary platform positioned at the exit ends of said passages, a flexible belt normally positioned directly beneath said passages and serving to prevent flow of said articles from said passages, said platform having an opening formed therein, means for moving containers along beneath the exit end of said passages in a continuous, uniform, non-intermittent motion, and means for moving said belt away from the exit ends of said passages at said platform feed opening, and providing that said articles flow by gravity through said platform opening to fill said containers while they are being moved in said continuous, uniform, non-intermittent motion.

7. The combination defined in claim 6, wherein funnel means is positioned on said distributor member below several passages so that the articles from said several passages are guided into a single container while said container is being moved in a continuous, uniform, non-intermittent motion.

8. In a counting and loading machine for a plurality of discrete articles all of which are essentially of the same size and shape, the combination comprising a rotatable distributor member having a plurality of elongated passages formed therein, and article arresting mechanism including a band affixed to the surface of said distributor member across said passages, pin means mounted on said band and positioned to enter one of said passages to arrest the downward fall of an upper portion of said articles, spring means normally urging said pin means away from said passage, and actuating means for individually and selectively operating said pin means as said distributor member rotates, whereby said upper portion of said articles is arrested when the lower portion of said articles is being unloaded from the passage, said actuating means having a retractable member formed therein whereby said pin means is selectively prevented from entering said passage when said passage is obstructed.

9. The combination defined in claim 8, wherein means are provided for attacing said band at various positions along said passages.

10. In a counting and loading machine for a plurality of discrete articles, all of which are essentially of the same size and shape, the combination comprising a rotatable distributor member having a plurality of elongated passages formed therein, an article arresting mechanism including a band affixed to the surface of said distributor member across said passages, pin means mounted on said band and positioned to enter one of said passages to arrest the downward fall of an upper portion of said articles, spring means normally urging said pin means away from said passage, and actuating means including a fixed plate positioned at a predetermined distance from said band to operate said pin means as said band revolves with said distributor member.

11. The combination defined in claim 10, wherein said fixed plate is provided with plungers adapted to contact said pin means, and wherein said plungers are spring loaded so as to provide retraction of said plunger when said pin means is prevented from fully entering said passage.

12. In a machine for counting and loading a plurality of discrete articles into containers, all of said articles being essentially of the same size and shape, the combination comprising a rotatable distributor member having a plurality of downwardly extending elongated passages formed therein, means moving said containers along beneath the path of said rotating passages as the containers are filled with said articles, a substantially horizontally disposed vibrating plate fixed to said machine alongside the path of said rotating passages, means vibrating said vibrating plate, and guide means fixed to said machine intermediate said plate and said path for guiding the bottoms of said containers onto said plate.

13. The combination defined in claim 12, wherein said guide means includes an upper guide strap positioned outwardly of said container and container path, and a lower guide strap positioned intermediate said container and said rotatable distributor member.

14. In a counting and loading machine for a plurality of discrete articles all of which are essentially of the same size and shape, the combination comprising a rotatable distributor member having a plurality of passages formed therein through which said articles are moved by gravity, said distributor member being provided with a slot connecting each passage with the exterior of said distributor member, an article arresting endless belt located adjacent said distributor member and arranged to conform to the peripheral shape thereof, and resilient protuberances located on said belt and spaced apart so as to register through said slots with the articles located within said passages, said endless belt being arranged to move as said distributor member rotates by frictional contact of said protuberances in registry with said slots, thereby providing slight pressure against one of said articles in each of said passages successively as said distributor member rotates and arresting the articles in the upper portion of said passages.

15. In a counting and loading machine for a plurality of discrete articles all of which are essentially of the same size and shape, the distributor member comprising an upper belt made of resilient material and having tube-receiving openings formed therein, a lower belt made of resilient material and having tube-receiving openings formed therein, a replaceable tube connected between openings of the upper and lower belt, means for rotating said distributor member, and means for guiding the rotation of said distributor member in a substantially oval path.

16. The distributor member defined in claim 15, wherein said means for rotating said distributor member includes an upper and lower sprocket which are provided with teeth, and wherein said upper and lower belt are provided with teeth which mesh with said sprocket teeth.

17. In a counting and loading machine for a plurality of discrete articles, all of which are essentially of the same size and shape, the combination comprising a rotatable distributor member having a vertical passage disposed at the periphery thereof and arranged for the containment of said articles, said passage having an elongated opening formed therein, article arresting means disposed adjacent said passage and adapted to enter said opening to arrest the downward fall of an upper portion of said articles, gate means positioned at the lower terminal end of said passage, said gate means being arranged to open and to allow at least a part of said articles in said passage to fall from said passage as said passage is rotated to a predetermined position on said periphery of said distributor member, receptacle means disposed beneath said distributor member and arranged for the reception of articles as said articles fall from said passage, and conveyor means for said receptacle means, said conveyor means being arranged for continuous and synchronous movement with said distributor member, whereby said receptacle means is positioned beneath said passage whenever said gate means is open.

18. In a counting and loading machine for a plurality of discrete articles, the combination comprising a rotatable distributor member having a plurality of vertical passages disposed at the periphery thereof and arranged for the containment of said articles, article arresting means disposed adjacent said passages and arranged to arrest the downward fall of an upper portion of said articles, gate means positioned at the lower terminal end of said passages, said gate means being arranged to open and to allow at least a part of said articles to fall from each of said passages as each said passage is rotated to a predetermined position by said distributor member, conveyor means disposed beneath said distributor member and arranged for continuous and synchronous movement therewith, and receptacle means disposed in spaced relation on said conveyor means and arranged for positioning beneath each of said passages as each of said passages approaches said predetermined position at which said gate means opens.

19. In a counting and loading machine for a plurality of discrete articles all of which are essentially of the same size and shape, the combination which comprises a distributor member which is rotatable about a substantially vertical axis, a moldable, resilient outer belt detachably secured to the peripheral surface of said distributor member, said belt having a downwardly-extending passage formed therein shaped to conform to the shape of said articles and a transversely disposed slot opening to said passage, and article arresting means supported outside of said distributor member and extending into said passage through said slot.

References Cited in the file of this patent

UNITED STATES PATENTS

| | | |
|---|---|---|
| 1,961,191 | Bliss | June 5, 1934 |
| 1,987,916 | Thompson | Jan. 15, 1935 |
| 1,996,535 | Beck | Apr. 2, 1935 |
| 2,509,069 | Mrachek | May 23, 1950 |
| 2,551,981 | Thompson | May 8, 1951 |
| 2,621,096 | Broyles et al. | Dec. 9, 1952 |
| 2,656,962 | Daniels | Oct. 27, 1953 |
| 2,755,978 | Schoenewolf | July 24, 1956 |
| 2,845,759 | Cote et al. | Aug. 5, 1958 |